United States Patent [19]

Braun et al.

[11] Patent Number: 4,586,753
[45] Date of Patent: May 6, 1986

[54] TRANSFER STATION FROM A LONGWALL CHAIN CONVEYOR TO A DRIFT CHAIN CONVEYOR

[75] Inventors: Ernst Braun; Gert Braun, both of Essen-Heisingen, Fed. Rep. of Germany

[73] Assignee: Halbach & Braun, Fed. Rep. of Germany

[21] Appl. No.: 590,716

[22] Filed: Mar. 19, 1984

[30] Foreign Application Priority Data

Mar. 19, 1983 [DE] Fed. Rep. of Germany ....... 3309999

[51] Int. Cl.⁴ ...................... E21C 35/12; E21C 35/20; B65G 15/24
[52] U.S. Cl. ......................................... 299/43; 299/64; 198/517; 198/607; 198/560
[58] Field of Search .................. 299/43, 44, 18, 64, 299/65, 34; 198/606, 607, 637, 560, 517, 520, 735

[56] References Cited

U.S. PATENT DOCUMENTS

| | | | |
|---|---|---|---|
| 1,479,866 | 1/1924 | Moores | 198/606 |
| 2,736,420 | 2/1956 | McCarthy | 198/560 |
| 3,305,267 | 2/1967 | Van Dommelen | 198/517 |
| 3,524,531 | 8/1970 | Georg | 198/637 |
| 4,248,482 | 2/1981 | Truszczinski | 299/43 |
| 4,279,445 | 7/1981 | Hauschopp | 299/43 |
| 4,300,673 | 11/1981 | Von Viebahn et al. | 299/43 |

FOREIGN PATENT DOCUMENTS

| | | | |
|---|---|---|---|
| 1103234 | 1/1954 | Fed. Rep. of Germany | 198/560 |
| 2237976 | 2/1974 | Fed. Rep. of Germany | 198/606 |
| 2401833 | 7/1975 | Fed. Rep. of Germany | 198/735 |
| 2425020 | 12/1975 | Fed. Rep. of Germany | 198/637 |
| 2659855 | 8/1977 | Fed. Rep. of Germany | 198/606 |
| 1463764 | 2/1977 | United Kingdom | 198/606 |

*Primary Examiner*—Stephen J. Novosad
*Assistant Examiner*—Bruce M. Kisliuk
*Attorney, Agent, or Firm*—McGlew and Tuttle

[57] ABSTRACT

A transfer station from a longwall chain conveyor to a drift chain conveyor have upper and lower reaches which cross alternately. The upper belt section of the longwall conveyor comprises a scraper over the upper belt section of the drift conveyor. The working face side of the longwall conveyor has a plane guide for a coal plane and a plane chain which at least at the drift-side end of the longwall conveyor is guided via guide wheels to a gob-side drive unit. These two drift-side guide wheels are arranged with a vertical spacing from each other in the lower belt section of the longwall conveyor such that they form between them a passage for the chain belt and for the tappets of the longwall conveyor attached thereto. The drift-side guide wheels are arranged so close to the drift conveyor that in its drift-side and position the coal plane can transfer the won coal directly into the drift conveyor. In all, an especially compact plane chain deflection integrated into the longwall conveyor is realized.

6 Claims, 3 Drawing Figures

TRANSFER STATION FROM A LONGWALL CHAIN CONVEYOR TO A DRIFT CHAIN CONVEYOR

FIELD AND BACKGROUND OF THE INVENTION

This invention relates in general to mining machines and in particular to a new and useful transfer station construction extending from a longwall chain conveyor to a drift chain conveyor.

The invention relates particularly to a transfer station construction where, in the drift region of a mine, the belt sections and trough bottoms of a longwall conveyor alternately cross those of a drift conveyor. The upper belt section of the longwall conveyor is arranged over the upper belt section of the drift conveyor. Toward the working face of the longwall the logwall conveyor has a plane guide for a coal plane and a plane chain. Upper and lower plane sections of the plane chain are guided at the end regions of the longwall conveyor, to drive units on the waste or gob side of the longwall conveyor by means of superposed guide wheels. In such transfer stations, the trough bottom in the upper belt section of the longwall conveyor normally includes a passage opening for fine coal or the like, in the area of the drift conveyor.

A hauling and planing system for underground operations is known which comprises a longwall chain conveyor with a coal plane guided thereon and installed at the working face of a mine. A loading conveyor is associated with the longwall conveyor in the area of transition from the longwall to the drift of the mine. The longwall conveyor has, at its waste or gob side, drive units both for the conveyor chain and for the plain chain. Guide boxes having a chain inlet, a chain outlet, and superposed guide wheels are also provided for the upper and lower belt sections of the plane chain. These boxes are at the ends of the longwall conveyor and thus are not in the way when working with a drift-side loading conveyor. Such a loading conveyor is located away from the plane area on the working side, but on the gap side the loading conveyor. Such a loading conveyor is located away from the plane area on the working side, but on the gob side the loading conveyor is brought back onto the longwall conveyor and includes a discharge end disposed above the longwall conveyor. It is then possible to move the coal plane directly into the area of transition from longwall to drift and to mine what would otherwise be a dead area. On the other hand, such guide boxes cannot be used in a transfer station from a longwall conveyor to a drift conveyor due to the alternately crossing belt sections and trough bottoms, at least at the drift side head end of the longwall conveyor. Consequently, in the case of such a transfer station, it becomes impossible to move the coal plane along the coal face into the drift area, so that a dead area is left in the vicinity of transition from longwall to drift, which must be cleared manually. This is to be remedied by the invention.

SUMMARY OF THE INVENTION

The invention provides a transfer station from a longwall chain conveyor to a drift chain conveyor where the coal plane can be moved directly up to the drift conveyor, so that the otherwise remaining dead area in the transition from longwall to drift can readily be mined by the coal plane.

The invention includes a transfer station having two drift-side guide wheels which are vertically spaced from each other and arranged in the bottom belt section of the longwall conveyor such that they form between them a passage for the chain belt. The pushers connected to the longwall conveyor chain belt also pass through this passage. The guide wheels are so close to the drift conveyor that, in its drift-side end position, the coal plane loads the won coal into the drift conveyor or transfers it to the drift conveyor. According to the invention, the deflection of the plane chain is integrated into the longwall conveyor in such a way that the cross station of longwall conveyor and drift conveyor remains practically unaffected by the plane chain deflection. Also, the plane chain deflection requires no additional space in the hauling direction of the longwall conveyor and therefore can be placed extremely close to the drift conveyor. This makes it possible to advance the coal plane as far as possible toward the drift conveyor and therefore not only to mine what would otherwise be a dead space in the area of transition from longwall to drift, but also to transfer the coal practically directly to the drift conveyor. To optimize this coal transfer, the drift conveyor may include a loading ramp on its longwall side. The result is a compact plane chain deflection in the area of the transfer station.

The invention provides that the passage for the chain belt and for the pushers is defined by an upper intermediate bottom and a lower intermediate bottom in the lower belt section of the longwall conveyor. The two intermediate bottoms extend through the drift conveyor between the crossing upper belt section and lower belt section thereof. This forms a prolonged chain belt and pusher guide through the drift conveyor. A closed chain belt and pusher guide in the lower section of the longwall conveyor is thus achieved. This is both in the region of the transfer station and in the region of the plain chain deflection.

To achieve a satisfactory suspension of the guide wheels for the plane chain in a manner which is protected against the penetration of fine coal, the invention further provides that the two intermediate bottoms form bearing housings for the two guide wheels with the trough bottom in the upper belt section and also with a bottom plate in the lower belt section of the longwall conveyor as well as with spacer plates for the intermediate bottoms disposed on both sides of the guide wheels crosswise to the hauling direction.

An especially simple mounting of the guide wheels is achieved according to the invention, by providing wheel hubs for the two guide wheels, with slide-in cheeks on each side of each hub. A bearing housing for the wheels has corresponding slide-in cut-outs for receiving the slide-in cheeks and for centering the guide wheels. The wheels are thus closed between the slide-in cheeks, the intermediate bottoms and the bottom plate. The trough bottom in the upper belt section of the longwall conveyor, which is closed anyway, may have on its underside, slide-in strips for the top slide-in cheek of the upper guide wheel.

The advantages obtained with the invention include the provision of a transfer station from a longwall conveyor to a drift chain conveyor which is very compact. The plane chain deflection is integrated into the longwall conveyor in such a way that the coal plane not only can mine what would normally be a dead space in the area of transition from the longwall to the drift, but can transfer the coal won there directly to the drift chain conveyor. This is because the coal plane can be moved right up to the drift conveyor. Moreover, an especially protected construction is realized for the longwall conveyor, permitting easy and fast assembly and disassembly of the guide wheels for the plane chain. In all, the functionality of the transfer station remains intact, while through the plane chain deflection according to the invention, the working field of the coal plane is lengthened and loading is optimized.

Accordingly, it is an object of the invention to provide a transfer station from a longwall to a drift which comprises a drift chain conveyor and a longwall chain conveyor which each have upper and lower conveyor chain belt reaches and a construction providing a passage for a chain belt from the longwall conveyor between the upper and lower reaches of the drift chain conveyor. First and second longwall coal plane chain guide wheels are rotatably mounted above and below the passage adjacent the drift wall conveyor so as to accommodate a drive for these wheels and thus for the coal plane, at a location such that the coal plane may move to deposit coal directly onto the drift conveyor at the transfer station.

A further object of the invention is to provide a transfer station from a longwall chain conveyor to a drift chain conveyor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
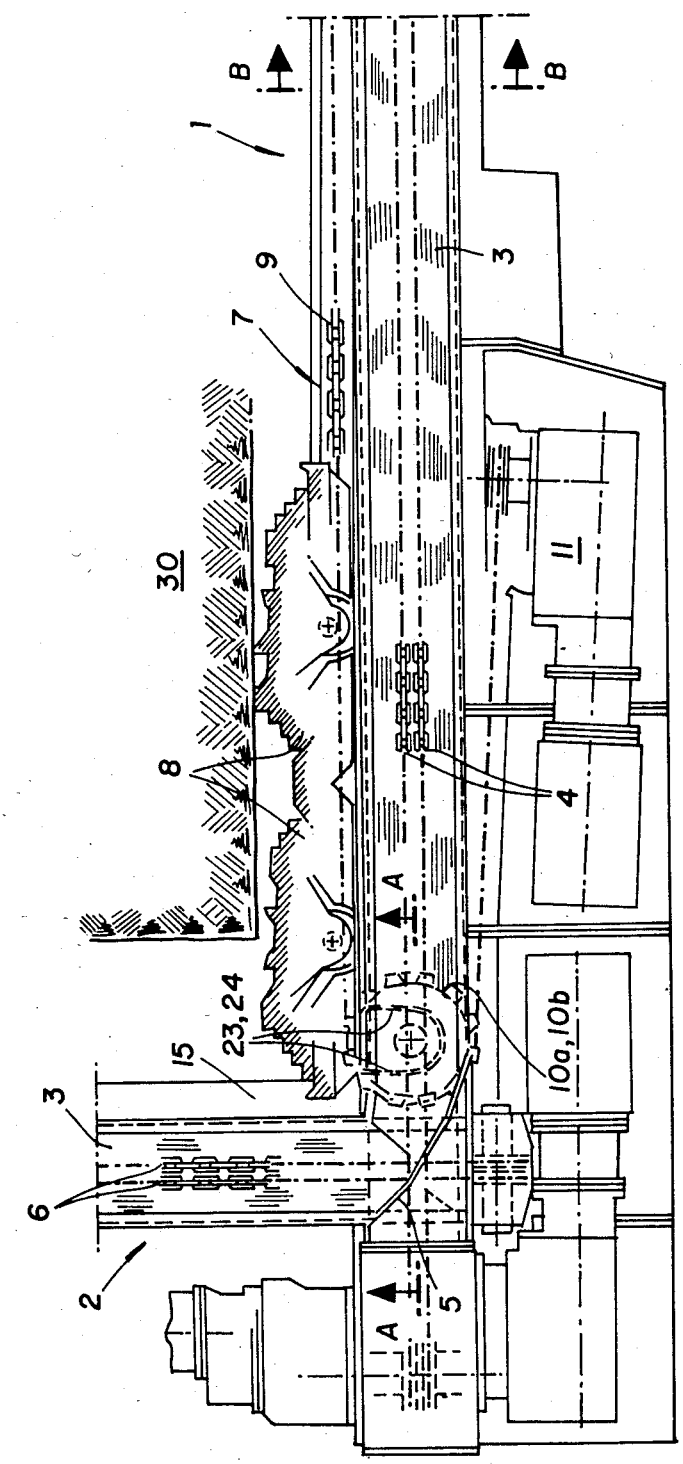
FIG. 1 shows a transfer station according to the invention in schematic plan view with the coal plane at one of its end positions.
Figure 2:
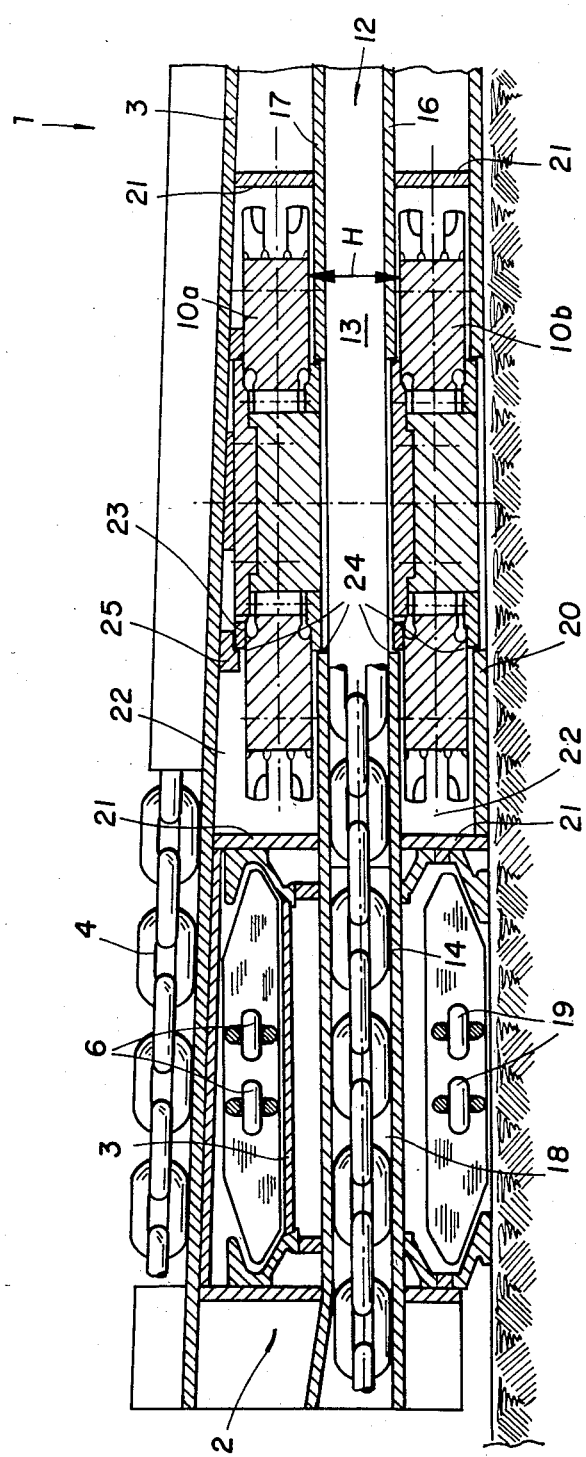
FIG. 2 is a partial vertical section of the transfer station taken along line A—A of FIG. 1.
Figure 3:
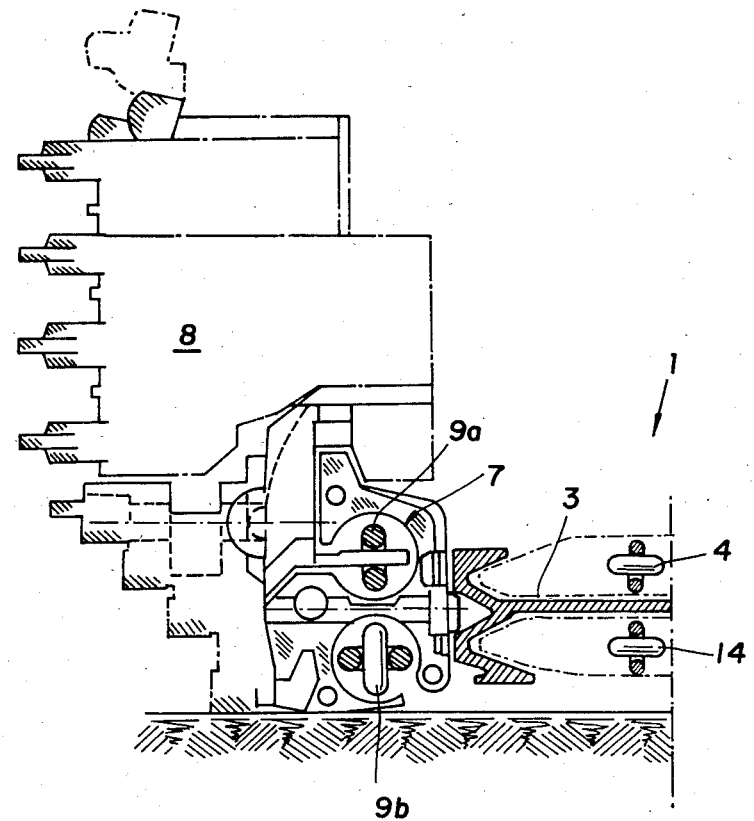
FIG. 3 is a partial vertical section through the longwall chain conveyor taken along line B—B of FIG. 1 but with the coal plane visible.

Referring to the drawings in particular, the invention embodied therein comprises a transfer station from a longwall chain conveyor 1 to a drift chain conveyor 2 wherein the drift chain conveyor 2 has upper and lower drift wall conveyor chain belt reaches with respective upper chain belt section 6 and lower chain belt section 19. The longwall conveyor has upper and lower conveyor chain belt reaches with respective upper chain belt section 4 and a lower chain belt section 14. In accordance with the invention, means are provided which define a longwall chain belt passage 13 for the lower reach chain belt having the lower reach chain belt section 14 with pushers (now shown) connected thereto, for the longwall conveyor 1. The passage 13 for the chain belt section 14 is defined between an upper intermediate bottom 17 and a lower reach intermediate bottom 16 which both extend between the upper and lower sections of the drift conveyor 2. A guide 18 is also provided to guide the chain section 14 and its pushers. In addition, the construction is such that first and second longwall coal plane chain guide wheels 10a and 10b are rotatably mounted respectively above and below the passage 13 at a location adjacent the drift wall conveyor 2 in a position such that a coal plane 8 may remove coal from the face 30 and deposit it directly onto the drift chain conveyor 2. The upper and lower belt sections and trough bottoms of the longwall and drift conveyors 1, 2, cross each other in the transition area between the drift and longwall, in a vertically alternating manner, with the upper longwall conveyor section and trough bottom being uppermost.

In the figures, a transfer station from the longwall chain conveyor 1 to the drift chain conveyor 2 is shown, where, in the drift zone, the sections and trough bottoms 3 of the longwall conveyor 1 and of the drift conveyor 2 alternately cross and the upper chain belt section 4 of the longwall conveyor 1, with a scraper 5 is arranged over the upper chain belt section 6 of the drift conveyor 2. Toward the working face the longwall conveyor 1 comprises a plane guide 7 for the coal plane 8 and a plane chain 9. The upper section 9a and lower section 9b of the plane chain, in the end regions of the longwall chain conveyor 1, are guided by means of superposed guide wheels 10a, 10b, to gob-side drive units 11. At least the two drift-side guide wheels 10a and 10b are arranged with a vertical distance H from each other in a bottom section 12 of the longwall conveyor 1 such that they form between them part of passage 13 for the chain belt 14 and the pushers of the longwall conveyor 1, attached thereto. The two drift-side guide wheels 10a and 10b are arranged so close to the drift conveyor 2 that in its driftside end position, the coal plane 8 loads the won coal into the drift conveyor 2 or transfers it thereto directly, possibly with the interposition of a loading ramp 15.

The passage 13 for the chain belt 14 and its pushers, is limited by the upper intermediate bottom 17 in the intermediate bottom 16 of the lower belt section 12 of the longwall conveyor 1. Both intermediate bottoms 16, 17 pass between the crossing upper belt section 6 and lower belt section 19 of the drift conveyor 2 and form the prolonged chain belt and pusher guide 18. The two intermediate bottoms 16, 17, the trough bottom 3 of the upper belt section 4, a bottom plate 20 in the lower belt section 12 of the longwall conveyor 1 and spacer plates 21 for the intermediate bottoms that are arranged on both sides of the guide wheels 10a, 10b crosswise to the transport direction of the longwall conveyor 1, together form bearing housings 22 for the two guide wheels 10a, 10b. The two guide wheels 10a, 10- are mounted for rotation on wheel hubs which each have slide-in cheeks 23 on both sides thereof. Slide-in cut-outs 24, for receiving the slide-in cheeks 23 and for centering the guide wheels 10a, 10b, are provided in bottoms or plates 17, 16 and 20. The uninterruptedly closed trough bottom 3 carries on its underside, slide-in strips 25 for the top slide-in cheek 23 of the upper guide wheel 10a. During assembly, therefore, the guide wheels 10a, 10b can be pushed into the bearing housing 22.

While specific embodiments of the invention have been shown and described in detail to illustrate the application of the principles of the invention, it will be understood that the invention may be embodied otherwise without departing from such principles.

What is claimed is:

1. A transfer station from a longwall chain conveyor to a drift chain conveyor wherein the longwall and drift chain conveyors both include upper chain belt sections and trough bottoms, and lower chain belt sections and trough bottoms, the longwall chain conveyor having a working side for facing the longwall of a mine, and a waste side for facing away from the longwall of a mine, comprising:

said upper and lower chain belt sections and trough bottoms for said longwall and drift chain conveyors crossing each other in a vertically alternating manner with the upper chain belt section and trough bottom of said longwall conveyor being disposed above the upper chain belt section and trough bottom of said drift conveyor;

a plane guide connected to said working side of said longwall conveyor for guiding a coal plane having upper and lower plane chain sections, said plane guide also guiding said upper and lower plane chain sections;

upper and lower guide wheels rotatably mounted to said longwall conveyor at a location adjacent said drift conveyor, said upper and lower guide wheels being vertically spaced from each other by a selected vertical distance to define a passage, said lower chain belt section of said longwall conveyor disposed for movement in said passage, the upper and lower coal plane chain sections being engageable around said upper and lower guide wheels respectively for guiding the plane chain sections to a drive unit on said waste side of said longwall conveyor; and passage means between said upper and lower trough bottoms of said longwall conveyor defining an extension of said passage between said upper and lower guide wheels for receiving a full length of said lower chain belt section of said longwall conveyor;

where a coal plane being pulled by the coal plane chain sections is movable up to a location adjacent said drift conveyor for depositing coal won by the plane directly on said drift conveyor.

2. A transfer station according to claim 1, wherein said passage means comprises an upper intermediate bottom connected to said upper trough bottom of said longwall conveyor, and a lower intermediate bottom connected to said lower trough bottom of said longwall conveyor, said passage being defined between said upper and lower intermediate bottoms, said intermediate bottoms extending between said upper and lower trough sections, said drift conveyor, said intermediate bottoms defining a chain and pusher guide between said upper and lower trough bottom of said drift conveyor for guiding said lower chain belt section of said longwall conveyor, said lower chain belt section having pushers connected thereto which are also guided by said chain and pusher guide.

3. A transfer station according to claim 2, wherein said upper guide wheel is mounted for rotation between said upper trough bottom of said longwall conveyor and said upper intermediate plate, said lower trough bottom of said longwall conveyor having a bottom plate, said lower guide wheel being rotatably mounted between said lower intermediate bottom and said bottom plate, first spacer plates connected between said upper trough bottom of said longwall conveyor and said upper intermediate plate for defining a bearing housing for said upper guide wheel, and second spacer plates connected between said lower intermediate plate and said bottom plate of said lower trough bottom of said longwall conveyor for defining a bearing housing for said lower guide wheel, said spacer plates all extending transversely to a direction of movement of said upper and lower chain belt sections of said longwall conveyor.

4. A transfer station according to claim 3, including a slide in cutout in each of said upper and lower intermediate plates, a slide in cheek engaged in each of said slide in cutouts, and a hub mounted on each cheek, each hub disposed in one of said bearing housings and rotatably carrying said upper and lower guidewheels respectively.

5. A transfer station according to claim 4 wherein said bottom plate of said lower trough bottom of said longwall conveyor includes a further slide in cutout, a further slide in cheek disposed in said further slide in cutout and disposed on an opposite side of said hub for said lower guide wheel.

6. A transfer station according to claim 5, wherein said upper trough bottom of said longwall conveyor includes an undersurface facing said bearing housing of said upper guide wheel, a slide in strip engaged against said upper surface, and a top slide in cheek engaged over said hub of said upper guide wheel and connected to said slide in strip.

* * * * *